(12) United States Patent
Guri et al.

(10) Patent No.: US 10,402,563 B2
(45) Date of Patent: Sep. 3, 2019

(54) AUTOMATED CLASSIFICATION OF EXPLOITS BASED ON RUNTIME ENVIRONMENTAL FEATURES

(71) Applicant: MORPHISEC INFORMATION SECURITY LTD., Beer Sheva (IL)

(72) Inventors: Mordechai Guri, Modiin (IL); Michael Gorelik, Beer Sheva (IL); Ronen Yehoshua, Matan (IL)

(73) Assignee: MorphiSec Information Security Ltd., Beer Sheva (IL)

( * ) Notice: Subject to any disclaimer, the term of this patent is extended or adjusted under 35 U.S.C. 154(b) by 162 days.

(21) Appl. No.: 15/324,659

(22) PCT Filed: Feb. 11, 2016

(86) PCT No.: PCT/IB2016/050712
§ 371 (c)(1),
(2) Date: Jan. 6, 2017

(87) PCT Pub. No.: WO2017/137804
PCT Pub. Date: Aug. 17, 2017

(65) Prior Publication Data
US 2018/0181752 A1 Jun. 28, 2018

(51) Int. Cl.
*G06F 21/56* (2013.01)
*G06F 21/50* (2013.01)
(Continued)

(52) U.S. Cl.
CPC ........... *G06F 21/566* (2013.01); *G06F 21/50* (2013.01); *G06F 21/54* (2013.01); *G06F 21/554* (2013.01);
(Continued)

(58) Field of Classification Search
CPC .................................. G06F 21/50; G06F 21/56
See application file for complete search history.

(56) References Cited

U.S. PATENT DOCUMENTS

| 7,171,693 B2 | 1/2007 | Tucker et al. |
| 7,555,780 B2 | 6/2009 | Tucker et al. |

(Continued)

FOREIGN PATENT DOCUMENTS

| WO | 2014/051608 A1 | 4/2014 |
| WO | 2017/137804 A1 | 8/2017 |

OTHER PUBLICATIONS

International Search Report and Written Opinion received for PCT Patent Application No. PCT/IB2016/050712, dated Apr. 7, 2016, 13 pages.

(Continued)

*Primary Examiner* — Thaddeus J Plecha
(74) *Attorney, Agent, or Firm* — Fiala & Weaver P.L.L.C.

(57) ABSTRACT

Various approaches are described herein for the automated classification of exploit(s) based on snapshots of runtime environmental features of a computing process in which the exploit(s) are attempted. The foregoing is achieved with a server and local station(s). Each local station is configured to neutralize operation of malicious code being executed thereon, obtain snapshot(s) indicating the state thereof at the time of the exploitation attempt, and perform a classification process using the snapshot(s). The snapshot(s) are analyzed with respect to a local classification model maintained by the local station to find a classification of the exploit therein. If a classification is found, an informed decision is made as to how to handle the classified exploit. If a classification is not found, the snapshot(s) are provided to the server for classification thereby. The server provides an updated classification model containing a classification for the exploit to the local station(s).

20 Claims, 7 Drawing Sheets

(51) Int. Cl.
*G06F 21/54* (2013.01)
*G06F 21/55* (2013.01)
(52) U.S. Cl.
CPC ........ *G06F 21/56* (2013.01); *G06F 2221/033* (2013.01)

(56) References Cited

U.S. PATENT DOCUMENTS

| | | | |
|---|---|---|---|
| 7,904,959 | B2 | 3/2011 | Sidiroglou et al. |
| 7,962,961 | B1 | 6/2011 | Griffin et al. |
| 7,971,249 | B2 | 6/2011 | Horne |
| 8,341,627 | B2 | 12/2012 | Mohinder |
| 8,689,193 | B2 | 4/2014 | Hazra |
| 8,694,738 | B2 | 4/2014 | Bhattacharjee et al. |
| 8,713,679 | B2 | 4/2014 | Zorn et al. |
| 8,763,103 | B2 | 6/2014 | Locasto et al. |
| 2006/0259974 | A1* | 11/2006 | Marinescu ............... G06F 21/56 726/25 |
| 2009/0007100 | A1* | 1/2009 | Field ....................... G06F 21/53 718/1 |
| 2010/0031361 | A1 | 2/2010 | Shukla |
| 2012/0233612 | A1 | 9/2012 | Beckett |
| 2013/0031632 | A1* | 1/2013 | Thomas .................. G06F 21/55 726/23 |
| 2013/0042294 | A1* | 2/2013 | Colvin ..................... G06F 21/53 726/1 |
| 2014/0229717 | A1 | 8/2014 | Venkat et al. |
| 2014/0359773 | A1 | 12/2014 | Matthews et al. |
| 2014/0380473 | A1* | 12/2014 | Bu ........................... G06F 21/53 726/23 |
| 2015/0101047 | A1* | 4/2015 | Sridhara ................. G06F 21/55 726/23 |
| 2016/0191550 | A1* | 6/2016 | Ismael ................ H04L 63/1416 726/1 |
| 2016/0378979 | A1* | 12/2016 | Kapoor ................. G06F 21/554 726/23 |
| 2017/0083703 | A1* | 3/2017 | Abbasi .................... G06F 21/566 |
| 2017/0111374 | A1* | 4/2017 | Harris .................... H04L 63/145 |
| 2017/0126736 | A1* | 5/2017 | Urias .................. H04L 63/1491 |

OTHER PUBLICATIONS

Cheng et al., "An Information Retrieval Approach for Malware Classification Based on Windows API Calls", Proceedings of the International Conference on Machine Learning and Cybernetics, Tianjin, vol. 4, Jul. 14-17, 2013, pp. 1678-1683.

International Preliminary Report on Patentability and Written Opinion Received for PCT Patent Application No. PCT/IB2016/050712, dated Aug. 23, 2018, 8 pages.

* cited by examiner

AUTOMATED CLASSIFICATION OF EXPLOITS BASED ON RUNTIME ENVIRONMENTAL FEATURES

This application is a U.S. national phase of International Application No. PCT/IB2016/050712 filed Feb. 11, 2016, which designated the U.S. and is incorporated by reference herein in its entirety.

BACKGROUND

Technical Field

Embodiments described herein generally relate to detecting, classifying and/or neutralizing malicious code or other security threats on computer systems.

Description of Related Art

Modern malicious code goes beyond traditional malware, and is notoriously harder to detect by ordinary anti-malware techniques. Unlike traditional malware, the implementation of malicious code does not require an executable file written to the hard disk of the target computer. Consequently, ordinary anti-malware programs that rely on scanning new files as they are downloaded, and trying to find a match with some static malware signature, are ineffective since there is no file to scan. In some cases, the malicious code is hidden within a data file such as a PDF (Portable Document Format) file. Although in such cases the anti-malware program may scan the file, the malicious code may exploit some hitherto unknown vulnerability in the application that opens the file (e.g., a PDF reader or other similar programs), thereby rendering the malicious code undetectable by traditional anti-malware programs. Furthermore, unlike executable files, ubiquitous data files are not blocked automatically by prevailing email providers. In other cases, the malicious code resides on a Web server, waiting for an incautious surfer, and exploits vulnerabilities in the user's browser or a browser's plugin. In yet other cases, the malicious code resides on a remote machine and exploits a vulnerability in some networking service available on the target computer.

Typical implementations of malicious code involve code injection, where a vulnerability in a program is exploited to inject external code into a running process on the target computer. Once the external, malicious code is successfully injected into the process, it executes under the identity of that process. Subsequently, it may proceed by performing one or more types of malicious activities or serving as a backdoor for various types of malicious payloads.

Conventional anti-malware programs focus on preemptive measures such as DEP (Data Execution Prevention) and ASLR (Address Space Layout Randomization), but those mechanisms do not provide hermetic protection against advanced variations of malicious code. Other protective techniques, such as ISR (Instruction Set Randomization) involve various modifications to the runtime environment of the sensitive process, making it inaccessible to external code.

BRIEF SUMMARY

Methods, systems, and apparatuses are described for detecting, classifying and/or neutralizing malicious code or other security threats on computer systems, substantially as shown in and/or described herein in connection with at least one of the figures, as set forth more completely in the claims.

BRIEF DESCRIPTION OF THE DRAWINGS

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
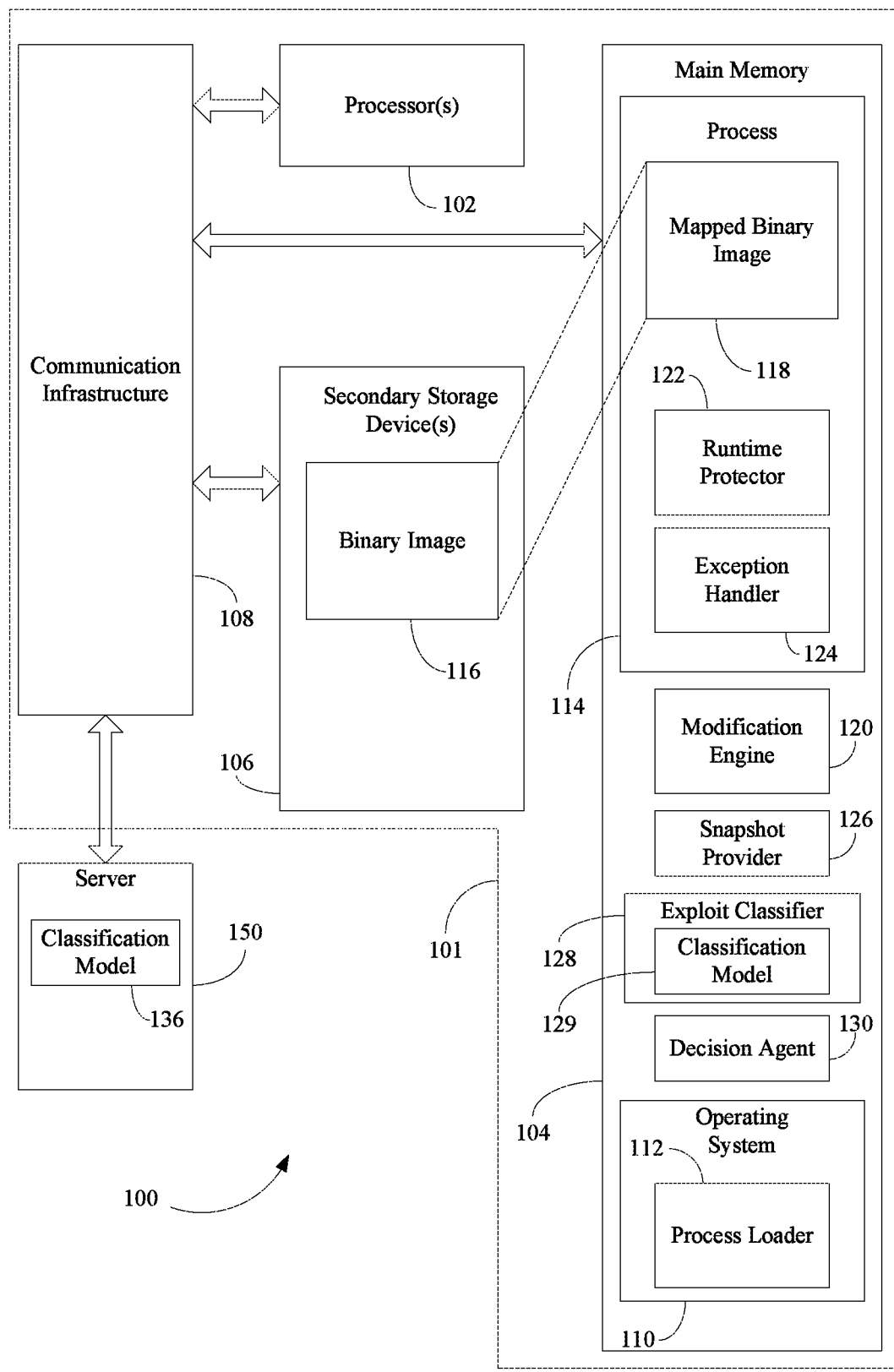
FIG. 1 depicts components of a computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. The section/subsection headings utilized herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Conventional anti-malware programs do not offer an effective systematic method for handling malicious code after the execution thereof has been halted. Blocking the operation of such malicious code usually involves halting the target process that has been attacked. Although the immediate threat has been blocked, the system should not be kept in that state. Further steps should be taken to classify the type of exploit or attack and determine the preferable defensive reaction.

In particular, a method performed by a computing device is described herein. In accordance with the method, execution of malicious code injected into a computing process is halted. A snapshot of at least the computing process is obtained in response to halting execution of the malicious code. A classification process is performed using the snapshot to classify an exploit attempted by the malicious code to obtain a classification of the exploit. The exploit is handled based on the obtained classification.

In accordance with an embodiment, the classification process comprises analyzing the snapshot with respect to a first classification model stored on the computing device, determining whether a classification for the exploit is found in the first classification model, and in response to determining that the classification is not found, providing the snapshot to a second computing device configured to analyze the snapshot for classification of the exploit.

In accordance with an embodiment, the method further comprises, in response to determining that the classification is not found, classifying the exploit as a zero-day exploit.

In accordance with an embodiment, the method further comprises, in response to determining that the classification is not found, obtaining an update for the first classification model from the second computing device that includes a classification for the exploit, the classification being the obtained classification.

In accordance with an embodiment, the handling of the exploit comprises performing at least one of the following based on the obtained classification: terminating execution of the computing process, restarting the computing process, and isolating the malicious code.

In accordance with an embodiment, the obtaining of the snapshot comprises obtaining a snapshot of at least the computing process and an operating system executing on the computing device in response to halting execution of the malicious code.

In accordance with an embodiment, the snapshot comprises at least one of the following: register values at the time of said halting, a number of sequential calls from a particular library module that occurred prior to said halting, a listing of library modules loaded at the time of said halting, a listing of file handles opened at the time of said halting, and at least a partial memory dump at the time of said halting.

A system is also described herein. The system includes one or more processing units and a memory coupled to the one or more processing units, the memory storing instructions, which, when executed by the processing unit(s), are configured to perform operations. In accordance with the operations, execution of malicious code injected into a computing process is halted. A snapshot of at least the computing process is obtained in response to halting execution of the malicious code. A classification process is performed using the snapshot to classify an exploit attempted by the malicious code to obtain a classification of the exploit. The exploit is handled based on the obtained classification.

In accordance with an embodiment, the classification process comprises analyzing the snapshot with respect to a first classification model stored on the computing device, determining whether a classification for the exploit is found in the first classification model, and in response to determining that the classification is not found, providing the snapshot to a second computing device configured to analyze the snapshot for classification of the exploit.

In accordance with an embodiment, the operations further comprise, in response to determining that the classification is not found, classifying the exploit as a zero-day exploit.

In accordance with an embodiment, the operations further comprise, in response to determining that the classification is not found, obtaining an update for the first classification model from the second computing device that includes a classification for the exploit, the classification being the obtained classification.

In accordance with an embodiment, the handling of the exploit comprises performing at least one of the following based on the obtained classification: terminating execution of the computing process, restarting the computing process, and isolating the malicious code.

In accordance with an embodiment, the obtaining of the snapshot comprises obtaining a snapshot of at least the computing process and an operating system executing on the computing device in response to halting execution of the malicious code.

In accordance with an embodiment, the snapshot comprises at least one of the following: register values at the time of said halting, a number of sequential calls from a particular library module that occurred prior to said halting, a listing of library modules loaded at the time of said halting, a listing of file handles opened at the time of said halting, and at least a partial memory dump at the time of said halting.

A computer-readable storage medium having program instructions recorded thereon that, when executed by a processing device, perform a method handling an exploit attempted by malicious code is further described herein. In accordance with the method, execution of malicious code injected into a computing process is halted. A snapshot of at least the computing process is obtained in response to halting execution of the malicious code. A classification process is performed using the snapshot to classify an exploit attempted by the malicious code to obtain a classification of the exploit. The exploit is handled based on the obtained classification.

In accordance with an embodiment, the classification process comprises analyzing the snapshot with respect to a first classification model stored on the computing device, determining whether a classification for the exploit is found in the first classification model, and in response to determining that the classification is not found, providing the snapshot to a second computing device configured to analyze the snapshot for classification of the exploit.

In accordance with an embodiment, the method further comprises, in response to determining that the classification is not found, classifying the exploit as a zero-day exploit.

In accordance with an embodiment, the method further comprises, in response to determining that the classification is not found, obtaining an update for the first classification model from the second computing device that includes a classification for the exploit, the classification being the obtained classification.

In accordance with an embodiment, the handling of the exploit comprises performing at least one of the following based on the obtained classification: terminating execution of the computing process, restarting the computing process, and isolating the malicious code.

In accordance with an embodiment, the obtaining of the snapshot comprises obtaining a snapshot of at least the computing process and an operating system executing on the computing device in response to halting execution of the malicious code.

III. Example Systems and Methods for Detecting, Classifying and/or Neutralizing the Execution of Malicious Code Various approaches are described herein for the automated classification of one or more exploits based on runtime snapshots of environmental features associated with the process in which the exploit(s) are attempted. The foregoing may be achieved with a centralized computing device (e.g., a server) and/or one or more local computing devices (also referred to as "local station(s)"). Each local station may be configured to detect and/or neutralize operation of malicious code being executed thereon, obtain one or more snapshots that indicate the state thereof at the time of the exploitation attempt, and perform a classification process using the snapshot(s). The classification process may comprise analyzing features of the snapshot(s) with respect to a local classification model maintained by the local station to find a classification of the exploit therein. If a classification for the exploit is found, an informed decision may be made as to how to handle the classified exploit. If a classification for the exploit is not found (e.g., the exploit is a zero-day exploit), the snapshot(s) may be provided to the server for classification thereby. The server may be configured to analyze the snapshot(s) utilizing Machine Learning (ML) and/or Data Mining (DM) techniques to determine a classification for the exploit. Upon determining a classification for the exploit, a classification model maintained by the server (e.g., a central classification model) is updated to reflect the newly-classified exploit and is distributed to the local station(s), which update their respective local classification models accordingly, thereby enabling the local station(s) to obtain a classification for the previously-unclassified exploit attempted thereon.

Subsection A describes systems and techniques for detecting and/or neutralizing malicious code or other security threats on computer systems in accordance with embodiments. Subsection B describes systems and techniques for classifying exploits attempted by such malicious code or other security threats on computer systems in accordance with embodiments. It is noted that the systems and techniques for classifying exploits described in Subsection B may be performed in systems other than those described in Subsection A. In particular, the systems and techniques for classifying exploits described in Subsection B may be used in conjunction with any systems or techniques that are used for detecting and/or neutralizing malicious code.

A. Detecting and/or Neutralizing Malicious Code or Other Security Threats on Computer Systems Malicious code (e.g., malware) including injected shellcode, relies on some basic assumptions regarding the runtime context of the target in order to initialize itself and to execute its payload properly. In general, shellcode injected into a running process has to perform some initial steps before it can proceed. It should perform at least some of the initiation steps that the system's default loader would normally perform when creating a running process from an executable file (e.g., a binary image). In particular, it is crucial for the injected code to obtain the addresses of certain shared libraries (e.g., dynamic-link libraries (DLLs)) as they are mapped into the address space of the running process, and to further obtain the addresses of the procedures (or functions) that it intends to use. In the case where the vulnerability resides inside a shared library, the injected code only needs to find the specific functionality within that library and does not need to locate the library itself.

Various approaches are described herein for, among other things, classifying, neutralizing and/or detecting attacks by such malicious code. This may be achieved, for example, by modifying one or more instances of a protected process upon loading by injecting a runtime protector that (a) creates a copy of each of the process' imported libraries and maps the copy into a random address inside the process' address space (to form a randomized "shadow" library), (b) replaces the procedure addresses within the original libraries, to point at a stub (thereby forming a "stub" library), and (c) intercepts procedure calls for late library loading and creates a shadow library and a stub library for such libraries.

The above technique is referred to herein as "morphing." In one implementation of this technique, the addresses of the shadow libraries (and procedures included therein) e randomized, ensuring that each process and each process' instance obtain a unique protective shield. In accordance with an embodiment, morphing is performed dynamically during initialization of the process, where librar(ies) loaded during process initialized are morphed. In accordance with another embodiment, morphing is performed dynamically during runtime, where librar(ies) loaded during runtime (i.e., after process initialization is complete) are morphed.

In further accordance with this technique, when injected (e.g., malicious) code attempts to retrieve the address of a given procedure, it will be directed to the stub library (the library at the original address) and receive the address of the stub procedure. Consequently, the injected code will not be able to perform its malicious activities. Furthermore, its presence can be detected. However, when the original program's code (e.g., the non-malicious code) attempts to retrieve the address of a procedure, it will use the address of the shadow library and receive the correct address of the requested procedure. Consequently, the original program's code will proceed normally.

Various embodiments described herein offer at least the following additional advantages: (a) when the presence of malicious code is detected, the malicious code can be sandboxed or otherwise diverted to a secure environment, to deceive the attacker and/or to learn the malware's behavior and intentions; (h) a user or administrator can define, for a given process, a set of procedure calls that are prohibited under any circumstances (also referred to herein as an "API Firewall"); (c) the overall impact on the system's performance may be relatively low, particularly compared to runtime behavioral monitoring, which tries to detect malicious code rather than preempt it; and (d) no prior knowledge of the current malware is assumed, therefore prevention of new, unknown, or zero-day attacks is possible.

Furthermore, embodiments described herein overcome the limitations of ASLR and DEP, and can be applied in concert with those techniques to gain optimal protection.

For the sake of brevity, embodiments described herein are described in terms of the MICROSOFT® WINDOWS®

Operating System (OS), published by Microsoft Corporation of Redmond, Wash. However, as should be clear to any person skilled in the art, this is just one possible embodiment. Similar embodiments may protect practically all kinds of modern operating systems, including LINUX® and other UNIX® variants, against a very wide array of malicious-code attacks, whether remote or local.

Additionally, embodiments described herein refer to morphing techniques associated with librar(ies) for the sake of brevity. However, as should be clear to any person skilled in the art, this is just one possible embodiment. Similar embodiments may protect practically all kinds of codebase elements, including, but not limited to, DLL extensions, Component Object Models (COMB), etc.

FIG. 1 depicts components of a computer system 100 in accordance with one embodiment that detects, classifies and/or neutralizes the execution of malicious code associated with a computing process executing thereon. As shown in FIG. 1, computer system 100 includes a computing device 101 (referred to as a "local station") and a centralized computing device (e.g., a server) 150 (which is described below in Subsection B). Computing device 101 includes one or more processor(s) 102 (also called central processing units, or CPUs), a primary or main memory 104, and one or more secondary storage device(s) 106. Processor(s) 102, main memory 104, secondary storage device(s) 106, and server 150 are connected to a communication infrastructure 108 via a suitable interface, such as one or more communication buses or one or more networks (e.g., wireless or wired networks). Portions of communication infrastructure 108 may be part of computing device 101 (as shown in FIG. 1) and/or portions of communication infrastructure 108 may be external to and/or included in server 150). In some embodiments, processor(s) 102 can simultaneously operate multiple computing threads, and in some embodiments, processor(s) 102 may each comprise one or more processor core(s). Examples of main memory 104 include a random access memory (RAM) (e.g., dynamic RAM (DRAM), synchronous DRAM (SDRAM), dual-data rate RAM (DDRRAM), etc.). Secondary storage device(s) 106 may include for example, one or more hard disk drives, one or more memory cards, one or more memory sticks, a floppy disk, magnetic tape, compact disk. DVD, optical storage disk, or any other computer data storage device.

As shown in FIG. 1, main memory 104 stores an operating system 110. Operating system 110 may manage one or more hardware components (e.g., processor(s) 102, main memory 104, secondary storage device(s) 106, etc.) and software executing on first computing device 101. Example hardware components of first computing device 101 are described in detail below in reference to FIG. 7.

Operating system 110 may include one or more components that perform certain tasks relating to the execution of software on computing device 101. One such component is a process loader 112. Process loader 112 is configured to initiate the creation of a computing process (or "process") 114 in main memory 104. Process 114 is an instance of a computer program being executed by processor(s) 102. The computer program may comprise an application program (or "application"), a system program, or other computer program being executed by processor(s) 102. The computer program is embodied in instructions and/or data included in a binary image (e.g., binary image 116).

To initiate the creation of process 114, process loader 112 loads (or "maps") binary image 116, which is stored in secondary storage device(s) 106, into an address space allocated for process 114 in main memory 104 based on information included in binary image 116. The binary image mapped into main memory 104 is represented in FIG. 1 by mapped binary image 118. Process loader 112 builds up an initial execution context of process 114. Computer program execution (i.e., process 114) begins when processor(s) 102 commence executing the first instruction of the computer program. Process 114 may comprise one or more threads of execution that execute a subset of instructions concurrently.

As the program execution evolves, other component(s) of operating system 110 allocate various resources to process 114. The execution context of process 114 may comprise information about such resource allocation, a current state of the program execution, an instruction that is to be executed next, and other information related to the program execution. The computer program execution continues until processor(s) 102 execute a termination or halt instruction.

Additional information regarding the information included in binary image 116 and how process loader 112 maps binary image 116 into main memory 104 based on this information is described below with reference to FIG. 2.

Figure 2:
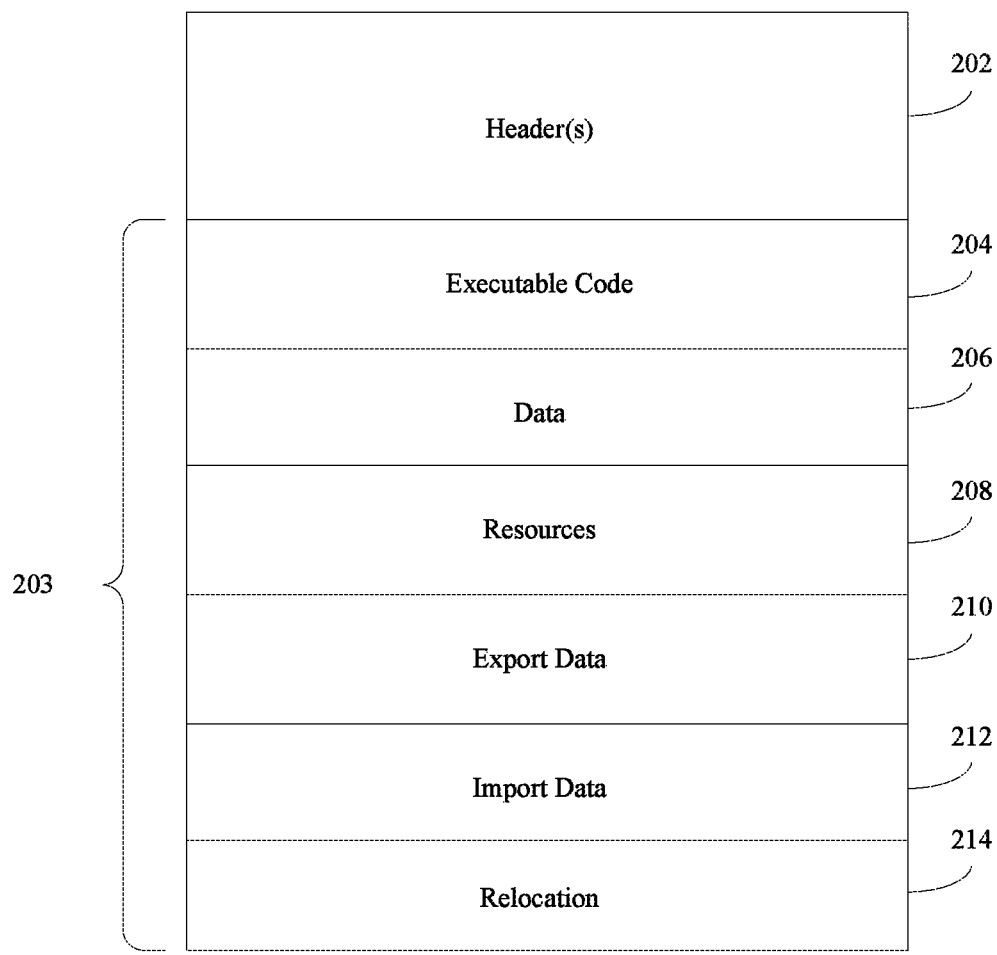
FIG. 2 depicts a layout of a binary image in accordance with an embodiment.
Figure 2:
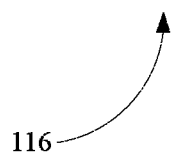

FIG. 2 is an example layout of binary image 116 in accordance with an embodiment. Examples of executable binary formats for binary image 116 include, but are not limited to, the portable executable (PE) format (e.g., files having an .exe, .dll, and a .sys extension), the Executable and Linkable Format (ELF), the Mach object (Mach-O) file format, etc.

As shown in FIG. 2, binary image 116 may comprise one or more headers 202 and/or one or more sections 203, which process loader 112 uses to map binary image 116 (or portions thereof) into main memory 104. Header(s) 202 may comprise information regarding the layout and properties of binary image 116 (e.g., the names, number and/or location of section(s) 203 within binary image 116). Header(s) 202 may also include a base address (also referred to as an image base) that specifies a default address at which binary image 116 is to be loaded into main memory 104. It is noted, however, that binary image 116 may be loaded at a different address. For example, if operating system 110 supports ASLR (which is technique used to guard against buffer-overflow attacks by randomizing the location where binary images are loaded into main memory 104), the address at which binary image 116 is loaded into main memory 104 will be a randomized address.

Section(s) 203 of binary image 116 may comprise an executable code section 204, a data section 206, a resources section 208, an export data section 210, an import data section 212 and a relocation section 214. Executable code section 204 comprises instructions that correspond to the computer program to be executed by processor(s) 102. The instructions may be machine code instructions that are to be executed by processor(s) 102 after binary image 116 is loaded into main memory 104.

Data section 206 comprises uninitialized data required for executing the computer program. Such data includes, but is not limited to, static and/or global variables. Resources section 208 comprises resource information that comprises read-only data required for executing the computer program. Such read-only data includes, but is not limited to, icons, images, menus, strings, etc. The read-only data may be stored in one or more tables (i.e., resource table(s)).

Export data section 210 may include information about the names and/or references of procedures exportable to other binary image(s) (e.g., DLL(s)). The export data may include an export directory that defines the names of exportable procedures included in binary image 116. The addresses of the exportable procedures may be stored in a table (e.g., an export address table (EAT)). The addresses of such exportable procedures may be provided to other binary images in response to the issuance by such other binary images of a procedure call (e.g., GetProcAddress) that identifies the procedure.

Import data section 212 may include information about the names and/or references of procedures that are imported by binary image 116. Import data section 212 may comprise an import directory, which includes information about other binary image(s) (e.g., DLL(s)) from which binary image 116 imports procedures. The information may include a location (e.g., an address) or a pointer to a location of a binary image that includes at least one procedure to be imported. The information may further include an import address table (IAT) that includes the name(s) of procedures to be imported and/or pointers to the procedures to be imported.

During process loading, process loader 112 may check the import data (e.g., the IAT) to determine if one or more additional binary images (e.g., libraries, such as DLLs) are required for process 114. Process loader 112 may map any such required binary image(s) into the address space of process 114. Process loader 114 may recursively parse the respective IATs of each required binary image to determine if further binary image(s) are required and map these further binary image(s) into the address space of process 114.

Process loader 112 replaces the pointers in the respective IATs with the actual addresses at which the procedures are loaded into main memory 104 as the procedures are imported. By using pointers, process loader 112 does not need to change the addresses of imported procedures everywhere in code of the computer program that such imported procedures are called. Instead, process loader 112 simply has to add the correct address(es) to a single place (i.e., the IAT), which is referenced by the code.

Relocation data section 214 comprises relocation data that enables process loader 112 to modify addresses associated with code and data items (respectively included in executable code section 204 and data section 206) specified in binary image 116. When a binary image is created (e.g., by a computer program, such as a linker), an assumption is made that the binary image is to be mapped to a base address, as described above. Based on this assumption, the linker inserts the real addresses (relative to the base address) of code and data items in the binary image. If for some reason the binary image is loaded at an address other than the image base (e.g., in the event that the image base is already occupied or due to an ASLR scheme being in place), these real addresses will be invalid. The relocation data enables process loader 112 to modify these addresses in binary image 116 so that they are valid. For example, the relocation data may include a relocation table, which includes a list of pointers that each point to a real address of a code and/or data item. When binary image 116 is remapped to an address other than the image base, process loader 112 updates these pointers. Thereafter, process loader 112 initiates the computer program by passing control to the program code loaded into main memory 104.

Returning to FIG. 1, in accordance with an embodiment, system 100 is configured to neutralize and/or intercept runtime in-memory exploits of processes (e.g., exploits performed by malicious code). Such exploits are carried out by identifying the memory location of a specific known object (e.g., of a procedure or data object having a predetermined fixed address) in a process's address space in main memory and using this location to calculate the location of other procedures that are required to fulfill the exploit.

To neutralize such exploits, first computing system 101 may include a modification engine 120, which executes in main memory 104. Modification engine 120 may be configured to modify (or "morph") process 114 to include a runtime protector 122 that causes the location of the in-memory data and code segments to be changed upon being loaded into main memory 104 in a random manner and updates legitimate code segments (i.e., non-malicious code segments) with these changes, thereby preventing malicious code from accessing such data and code segments. Furthermore, runtime protector 122 maintains the original in-memory data and code segments and intercepts any access to these segments to detect malicious activity.

For example, modification engine 120 may be configured to intercept a process creation event issued by operating system 110 (or a component thereof) for process 114. Modification engine 120 may verify that process 114 is designated for protection. For example, modification engine 120 may check that process 114 is included in a list of processes that should be protected. In response to determining that process 114 is to be protected, modification engine 120 causes the creation of the process to be suspended and injects runtime protector 122 into process 114. Runtime protector 122 may be a library (e.g., a DLL) that is injected into the address space of process 114.

Runtime protector 122 may be configured to determine whether any library modules (e.g., DLLs) have already been loaded into the address space of process 114. In response to determining that library module(s) have already been loaded into the address space of process 114, runtime protector 122 copies the library module(s) into a different, random memory range (referred to as a "shadow" library). The library module(s) loaded into the original address space are modified into a stub library (also referred to as a "shallow library"), which provides stub procedures or functions. Runtime protector 122 updates the IAT mapped into the address space of process 114 with the addresses corresponding to the random memory range. Thereafter, modification engine 120 causes process loader 112 to be released to allow process loader 112 to finalize the process creation for process 114.

Runtime protector 122 may also be configured to create shadow and stub libraries for library module(s) that are loaded after process finalization (e.g., "late" libraries). For example, runtime protector 122 may be configured to hook memory mapping procedure calls (e.g., that map libraries to a particular section of main memory 104, such as NtMapViewOfSection) that load "late" library module(s) into main memory 104. Upon intercepting such procedure calls, runtime protector 122 allows the call to be completed, thereby resulting in the library module(s) being loaded at their intended addresses in main memory 104. Thereafter, runtime protector 122 creates shadow and stub libraries for such library module(s) in a similar manner as described above.

Thus, when the original, non-malicious code attempts to retrieve a library module handle of a library module including the procedure requested for and/or the address of the procedure in one of the library module(s), it will receive the library module handle of the shadow library module and/or the address of the procedure in the shadow library module. Consequently, the original program's code will proceed normally as planned. However, when malicious code attempts to retrieve the library module handle of the same library module including the same procedure and/or the address of the procedure in the library module, the malicious code will receive the library module handle of the stub library module and/or the address of a procedure in the stub library module. Consequently, the malicious code will not be able perform its malicious activities.

In addition, the presence of the malicious code may be detected upon accessing the stub library. For example, in accordance with an embodiment, runtime protector 122 modifies the library module(s) loaded into the original address space into stub libraries by causing operating system 110 to designate the original address spaces at which executable portions (e.g., executable code) of the library module(s) are located as being non-accessible regions. Modification engine 120 may also inject an exception handler 124 into the address space of process 114, which intercepts an exception thrown by operating system 110 when code (e.g., malicious code) attempts to access the non-accessible region (i.e., the stub library). Upon detecting the exception, runtime protector 122 may be configured to halt execution of the malicious code.

In accordance with an embodiment, malicious code is detected by a user-configurable API firewall. For example, a user or administrator may be enabled (e.g., using a graphical user interface (GUI)) to define, for any given process, a set of procedure calls that are prohibited under any circumstances.

B. Classifying Malicious Code or Other Security Threats on Computer Systems

After execution of the malicious code is halted, the local station (i.e., computing device 101) may be configured to perform a classification process to classify the exploit attempted by the malicious code and perform a defensive reaction based on the classification. For example, computing device 101 may further include a snapshot provider 126, an exploit classifier 128, and a decision agent 130, which each execute in main memory 104.

Snapshot provider 126 may be configured to obtain one or more snapshots of the targeted process (i.e., process 114) and/or operating system 110 after execution of the malicious code is halted. The snapshot(s) may indicate the state of process 114 and/or operating system 110 at the time execution of the malicious code was halted. The obtained snapshot(s) may comprise one or more data items corresponding to a multitude of runtime environmental features of process 114 and/or operating system 110, which include, but are not limited, (i) an order of the librar(ies) of associated function calls that are stored in one or more stack frames of a call stack maintained by operating system 110; (ii) function call(s) stored in the stack frame(s) of the call stack to determine which function(s) were called up to the point of the attempted exploitation; (iii) a number of sequential function calls from the module in which the attempted exploitation occurred; (iv) a list of modules loaded into main memory 104 at the time execution of the malicious code was halted; (v) one or more values loaded into one or more registers of processor(s) 102 at the time execution of the malicious code was halted; (vi) a list of file handles that are open (which can be obtained, for example, by accessing tables in the kernel of operating system 110 that lists all the currently-opened files) at the time execution of the malicious code was halted; (vii) a partial or full memory dump of main memory 104 at the time execution of the malicious code was halted; (viii) contents of a call stack (e.g., function(s) called) associated with the user space (a region of main memory 104 allocated for user programs and/or processes) at the time execution of the malicious code was halted; and/or (ix) contents of a call stack (e.g., function(s) called) associated with the kernel space (a region of main memory 104 allocated for the kernel of operating system 110) at the time execution of the malicious code was halted. Snapshot provider 126 provides the obtained snapshot(s) to exploit classifier 128 and/or server 150 (e.g., via communication infrastructure 108) for classification.

Exploit classifier 128 is configured to classify the type of exploit attempted by the malicious code. Exploit classifier 128 may perform the classification using a classification model 129, which comprises classifications for a plurality of different previously-classified exploits. Classification model 129 may be based on a classification model 136 maintained by server 150. For example, classification model 129 may be a copy of classification model 136 (which is described in further detail below).

Each classification of classification model 129 may be based on a set of particular features that are associated with a particular type of exploit. Examples of such features include various statistical or information-theoretic traits (e.g. count, mean, median, standard deviation, entropy, etc.) of runtime environmental features (e.g., the data items described above).

When exploit classifier 128 receives snapshot(s) from snapshot provider 126, exploit classifier 128 extracts multiple features (i.e., statistical or information-theoretic traits (e.g. count, mean, median, standard deviation, entropy, etc.) from the data items included in the snapshot(s)) and/or extracts a unique descriptor or "fingerprint" for the exploit based on the data items and/or features. Exploit classifier 128 attempts to correlate (or match) the features and/or fingerprint to features and/or fingerprints for existing classification(s) stored in classification model 129 to determine whether the exploit is a known, previously-classified exploit (e.g., "Stagefright," "Conficker", "Sandworm," etc.). If a match is found, the determined classification is provided to decision agent 130.

If a match is not found, exploit classifier 128 may attempt to identify the general type of the exploit or the vulnerability involved and may determine that the exploit is a variant of a previously-classified exploit and/or classify the exploit as a zero-day attack. Examples of general types of exploits and/or vulnerabilities include, but are not limited to, buffer overflow exploits, stack-based buffer overflow exploits, use-after free vulnerabilities (a vulnerability where a pointer that has been previously released is used to reference memory after it has been freed, which can cause a program to crash, use unexpected values, or execute certain code (e.g., malicious code)), heap spraying exploits, integer overflow exploits, etc. Exploit classifier 128 then provides the snapshot(s) to server 150 for classification thereby. It is noted that in certain embodiments, snapshot provider 126 provides snapshot(s) to server 150 before exploit classifier 128 performs its classification operations. This advantageously mitigates the delay for classifying the exploit in the event that exploit classifier 128 is unable to classify the exploit. It is further noted that one or more notifications indicating that an exploit has been detected and/or neutralized on computing system 101 may be provided to other entities (e.g., registered subscribers, including agencies, authorities, software providers, etc.) that are concerned with patching vulnerabilities and preempting exploits.

Server 150 may initially obtain (e.g., during an initial training phase) classification model 136 by training on a bulk of data, which is obtained by performing static and dynamic analysis on malicious documents (or other files) gathered from various external sources. The training may be performed utilizing various techniques and paradigms known in the art of Machine Learning (ML) and Data Mining (DM), such as online learning, active learning, semi-supervised learning, or similar paradigms. In accordance with an embodiment, the initial training phase may comprise executing one or more files, determining which of the file(s) includes malicious code, and/or applying ML and DM techniques to analyze the malicious code, classify the malicious code, and obtain classification model 136 based on the determined classifications of the malicious code. Thereafter, server 150 continuously receives new data from external sources (e.g., additional malicious documents) and/or raw data from local stations (e.g., computing device 101) to form an accumulated data set. Such raw data from the local stations includes snapshot(s), other environmental information, and/or a file containing the malicious code. The raw data is pre-processed through a pipeline of operations that extract useful features and/or fingerprints from the raw data (e.g., various statistical or information-theoretic traits (e.g. count, mean, median, standard deviation, entropy, etc.)) of the data items included therein. Server 150 then processes the extracted features and/or fingerprints using techniques such as ML and DM and classifies the determined exploits by type, associates the appropriate features and/or fingerprints with each type, and updates classification model 136 accordingly.

After classification model 136 is updated, copies of classification model 136 are provided to local station(s) (e.g., computing device 101). The local station(s) update their respective local classification model (i.e., classification model 129) with the received copy.

Upon updating classification model 129, exploit classifier 128 matches the extracted features and/or fingerprints from the obtained snapshot(s) to the features and/or fingerprints of updated classification model 129 to determine the type of the current exploit. The determined classification is provided to decision agent 130.

Upon receiving a classification from exploit classifier 128, decision agent 130 may determine how to handle the present exploit based on the classification and cause runtime protector 122 to perform the appropriate defensive reaction. In accordance with an embodiment, decision agent 130 automatically determines how to handle the present exploit. For example, decision agent 130 may maintain a mapping between classifications and defensive reactions, and select the appropriate defense reaction based on the mapping. For instance, upon determining the classification is of a first type, decision agent 130 may cause runtime protector 122 to perform one or more first defensive reactions. Upon determining the classification is of a second type, decision agent 130 may cause runtime protector 122 to perform one or more second defensive reactions that are, at least in part, different than the first defensive reaction(s). In accordance with another embodiment, decision agent 130 may provide several options as to how to handle the exploit for a user to select. Upon selection, runtime protector 122 may perform the defensive reaction corresponding to the selected option.

Examples of defensive reactions include, but are not limited to, terminating the affected process or processes process 114), halting, disabling, or shutting down the affected system (i.e., computing device 101 or one or more components included therein (e.g., operating system 110)), rolling process 114 and/or the affected system back to a predetermined restore (or safe) point (e.g., the latest, ascertained restore point), restarting the affected process or processes of the affected system, trapping the malicious code in a sandboxed environment, preventing the malicious code from being loaded onto other machines, or a combination of any of these defensive reactions and/or other defensive reactions.

One or more particular clean-up procedures may be performed in response to performing one or more of the defensive reactions. For example, in the event that the defensive reaction is to terminate the affected process, the clean-up procedure(s) may include freeing one or more memory segments in main memory 104 or freeing other resources held by the affected process. In the event that the defensive reaction enables the affected process to be resumed, the clean-up procedure(s) may include freeing only memory segments or other resources that might have been affected by the malicious code. In the event that the defensive reaction is to shut down the affected system, the clean-up procedures may include properly terminating all running processes in computing device 101. In the event that the defensive reaction enables the affected system to be resumed, the clean-up procedure(s) may include terminating and/or restarting processes that might have been affected by the malicious code, freeing memory segments of main memory 104 or other resources that might have been affected by the malicious code, and/or similar operations. In each of these cases, the clean-up procedure(s) may include deleting or restoring files maintained by computing device 101, registry keys maintained by operating system 110, or other persistent objects that might have been affected by the malicious code.

It is noted that server 150, upon identifying and/or classifying the exploit, may search a database (e.g., an external public database (e.g., a common vulnerabilities and exposures (CVE) database or a non-public database (e.g., a database maintained by server 150)) for a patching solution (e.g., a software update) associated with the identified exploit. Upon finding a patching solution, server 150 may provide the patching solution to computing device 101 and/or provide an identifier to computing device 101 that enables computing device 101 to retrieve the patching solution from a location identified by the identifier. It is further noted that upon identifying and/or classifying the exploit, one or more rules may be created for implementation by runtime protector 122 to assist with identification of the exploit, e.g., static scanning rules and the like.

Figure 3:
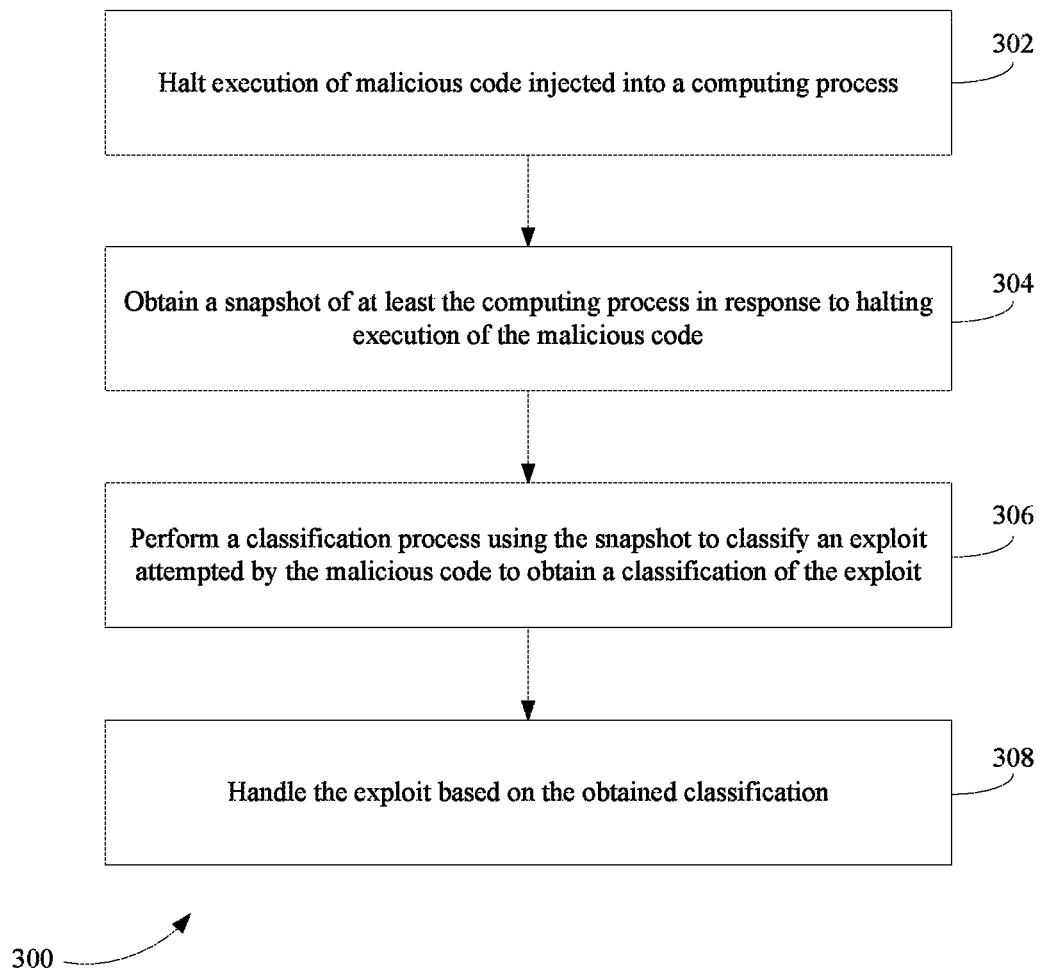
FIG. 3 depicts a flowchart of an example method for classifying runtime in-memory exploits of a process in accordance with an example embodiment.
Figure 4:
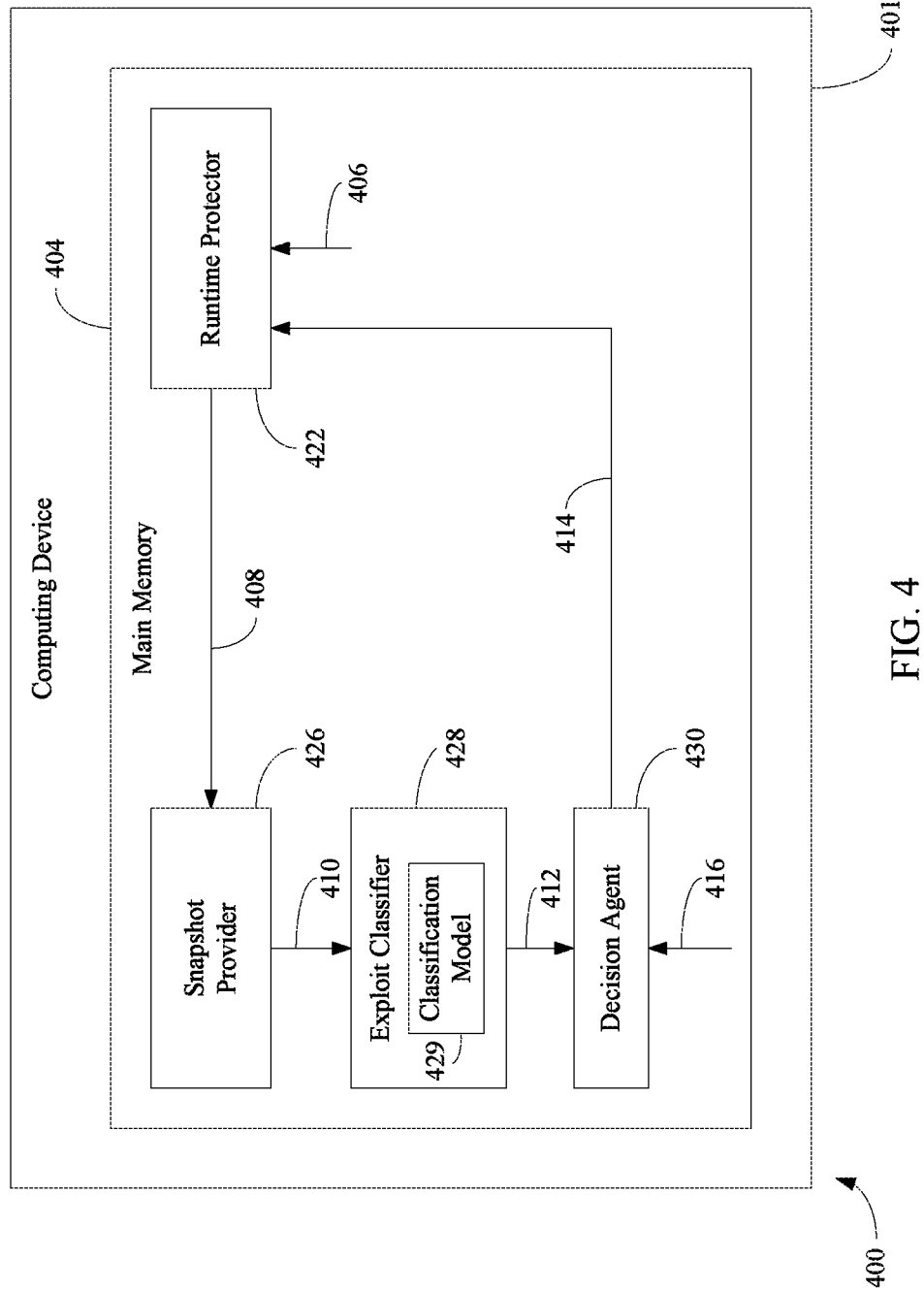
FIG. 4 depicts a block diagram of a main memory including a process in accordance with an embodiment.

Accordingly, in embodiments, system 100 may operate in various ways to classify runtime in-memory exploits of a process. For example, FIG. 3 depicts a flowchart 300 of an example method for classifying runtime in-memory exploits of a process, according to an example embodiment. System 100 shown in FIG. 1 may operate according to flowchart 300. For illustrative purposes, flowchart 300 is described with reference to FIG. 4. FIG. 4 shows a block diagram 400 of main memory 404 of a computing device 401, according to an embodiment. Main memory 404 is an example of main memory 104, and computing device 401 is an example of computing device 101, as shown in FIG. 1. Accordingly, snapshot provider 426, exploit classifier 428, classification model 429 and decision agent 430 are examples of snapshot provider 126, exploit classifier 128, classification model 129 and decision agent 130, as shown in FIG. 1. Further structural and operational embodiments will be apparent to persons skilled in the relevant art(s) based on the discussion regarding flowchart 300. Flowchart 300 and main memory 404 are described as follows.

Flowchart 300 begins with step 302. At step 302, execution of malicious code injected into a computing process is halted. For example, as shown in FIG. 4, runtime protector 422 halts execution of malicious code injected into a computing process (e.g., process 114, as described above in reference to FIG. 1). Runtime protector 422 may be configured to halt execution of the malicious code in response to receiving an exception 406 from an exception handler (e.g., exception handler 124, as described above in reference to FIG. 1) that throws exception 406 when the malicious code attempts to access a non-accessible region of memory (i.e., the stub library).

At step 304, a snapshot of at least the computing process is obtained in response to halting execution of the malicious code. For example, with reference to FIG. 4, snapshot provider 426 may be configured to obtain a snapshot of at the least the computing process in response to runtime protector 422 halting execution of the malicious code. Runtime protector 422 may provide an indicator 408 (indicating that execution of the malicious code has been halted) to snapshot provider 426 that causes snapshot provider 426 to obtain the snapshot. The snapshot (i.e., snapshot 410) is provided to exploit classifier 428.

In accordance with an embodiment, snapshot provider 426 also obtains a snapshot of an operating system executing on computing device 401 (e.g., operating system 110, as described above in reference to FIG. 1) in response to the execution of the malicious code being halted.

In accordance with an embodiment, the snapshot of the computing process and/or the snapshot of the operation system comprise one or more data items corresponding to a multitude of runtime environmental features of the computing process and or the operating system, which include, but are not limited, (i) an order of the librar(ies) of associated function calls that are stored in one or more stack frames of a call stack maintained by operating system 110 at the time that execution of the malicious code is halted; (ii) function call(s) stored in the stack frame(s) of the call stack to determine which function(s) were called up to the point that execution of the malicious code is halted; (iii) a number of sequential function calls from the module in which the attempted exploitation occurred; (iv) a list of modules loaded into main memory 104 at the time that execution of the malicious code is halted; (v) one or more values loaded into one or more registers of processor(s) 102 at the time that execution of the malicious code is halted; (vi) a list of file handles that are open (which can be obtained, for example, by accessing tables in the kernel of operating system 110 that lists all the currently-opened files) at the time that execution of the malicious code is halted; (vii) a partial or full memory dump of main memory 104 at the time that execution of the malicious code is halted; (viii) contents of a call stack (e.g., function(s) called) associated with the user space (a region of main memory 104 allocated for user programs and/or processes) at the time that execution of the malicious code is halted; and/or (ix) contents of a call stack (e.g., function(s) called) associated with the kernel space (a region of main memory 104 allocated for the kernel of operating system 110) at the time that execution of the malicious code is halted.

At step 306, a classification process is performed using the snapshot to classify an exploit attempted by the malicious code to obtain a classification of the exploit. For example, with reference to FIG. 4, exploit classifier 428 performs the classification process using snapshot 410 and a classification model 429 to obtain a classification 412 for the exploit. Classification 412 is provided to decision agent 430. Additional detail regarding the classification process is described below with reference to FIGS. 5 and 6.

At step 308, the exploit is handled based on the obtained classification. For example, with reference to FIG. 4, decision agent 430 handles the exploit based on classification 412.

In accordance with an embodiment, decision agent 430 automatically determines how to handle the exploit. For example, decision agent 430 may maintain a mapping between classifications and defensive reactions, and select the appropriate defense reaction based on the mapping. For instance, upon determining the classification is of a first type, decision agent 430 may cause runtime protector 422 to perform one or more first defensive reactions by providing an indication 414 that specifies the one or more first defensive reactions to be performed. Upon determining the classification is of a second type, decision agent 430 may cause runtime protector 422 to perform one or more second defensive reactions that are, at least in part, different than the first defensive reaction(s) by providing indication 414 that specifies the second defensive reaction(s).

In accordance with another embodiment, decision agent 430 may provide several options as to how to handle the exploit for a user to select. Upon receiving a user selection 416, decision agent 430 may provide indication 414 that specifies the selected option to runtime protector 422, which, in response, performs the defensive reaction corresponding to the selected option.

Examples of defensive reactions include, but are not limited to, terminating execution of the affected process or processes (e.g., process 114), halting or shutting down the affected system (i.e., computing device 401 or one or more components included therein (e.g., operating system 110)), rolling the affected process and/or the affected system back to a predetermined restore (or safe) point (e.g., the latest, ascertained restore point), restarting the affected process or processes or the affected system, trapping (or isolating) the malicious code to a sandboxed environment, or a combination of any of these defensive reactions and/or other defensive reactions.

Figure 5:
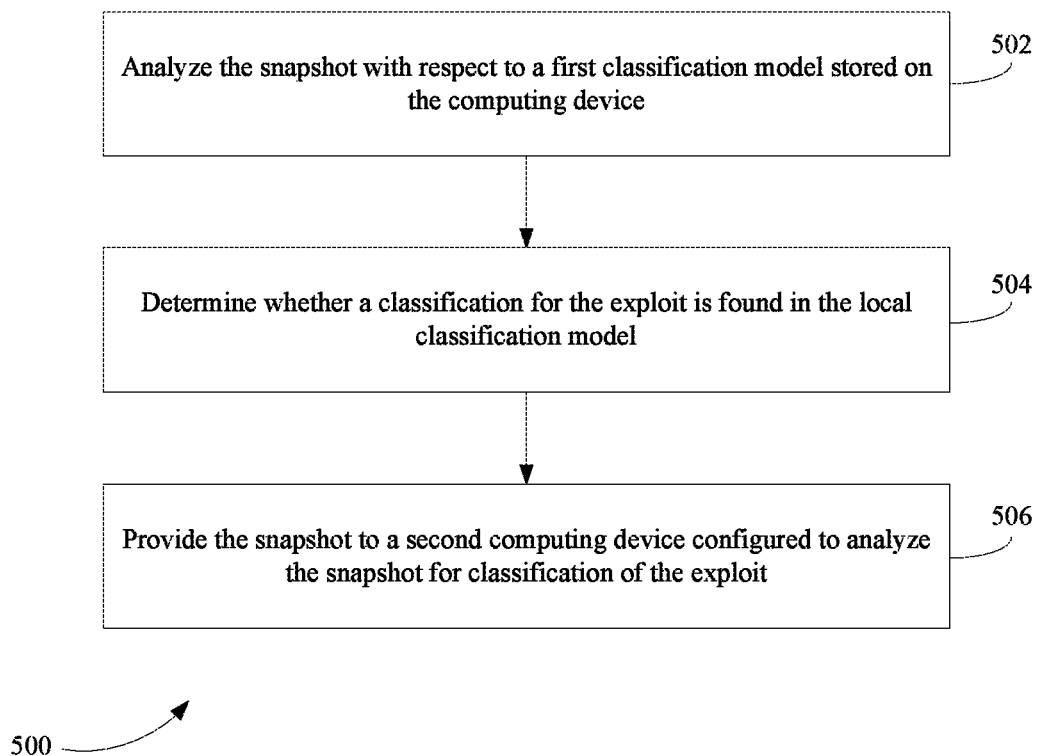
FIG. 5 depicts a flowchart of an example method for performing a classification process in accordance with an embodiment.
Figure 6:
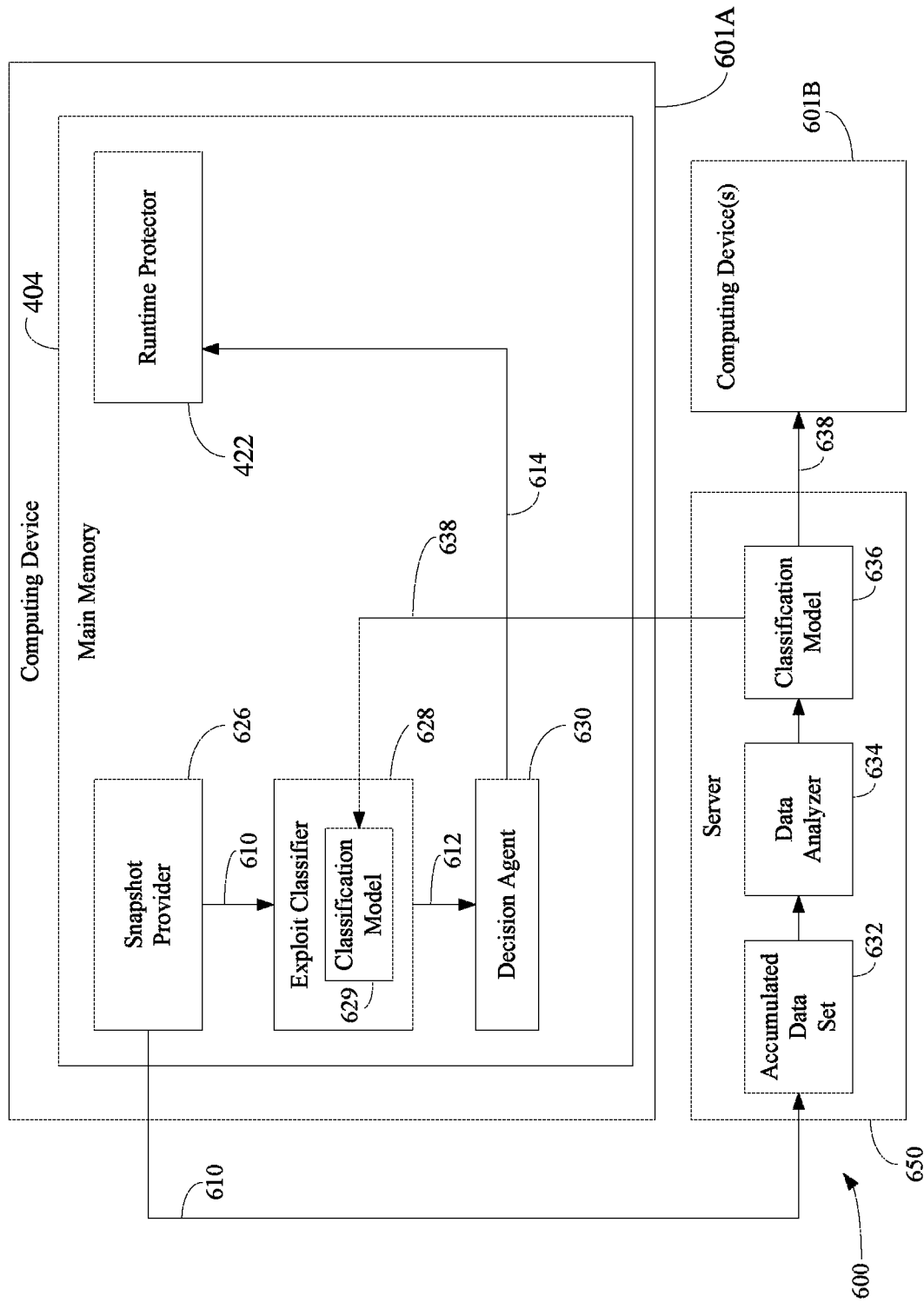
FIG. 6 depicts a block diagram of a computing system for performing a classification process in accordance with an embodiment.

In accordance with one or more embodiments, step 306 of flowchart 300 may be carried out according to the process shown in FIG. 5. For illustrative purposes, flowchart 500 is described with reference to FIG. 6. FIG. 6 shows a block diagram of a computing system 600 including a server 650, a first computing device 601A, and one or more second computing devices 601B. Server 650 is an example of server 150, as shown in FIG. 1. First computing devices 601A and 601B are examples of local stations (i.e., computing device 101, as shown in FIG. 1). Snapshot provider 626, exploit classifier 628, classification model 629 and decision agent 630 are examples of snapshot provider 126 and 426, exploit classifier 128 and 428, classification model 129 and 429 and decision agent 130 and 430, as respectively shown in FIGS. 1 and 4. As shown in FIG. 6, server 650 includes an accumulated data set 632, a data analyzer 634 and a classification model 636. Classification model 636 is an example of classification model 136, as shown in FIG. 1. Further structural and operational embodiments will be apparent to persons skilled in the relevant art(s) based on the discussion regarding flowchart 500. Flowchart 500, server 650, first computing device 601A and second computing device(s) 601B are described as follows. Other structural and operational embodiments will be apparent to persons skilled in the relevant art(s) based on the discussion regarding flowchart 500.

Flowchart 500 begins with step 502. At step 502, the snapshot is analyzed with respect to a first classification model stored on the computing device. For example, as shown in FIG. 6, exploit classifier 628 analyzes snapshot(s) (e.g., snapshots 610) provided by snapshot provider 610 with respect to classification model 629.

At step 504, a determination is made whether a classification for the exploit is found in the first classification model. For example, with reference to FIG. 6, exploit classifier 628 determines whether a classification for the exploit is found in classification model 629. For instance, exploit classifier 628 may attempt to match extracted features and/or fingerprints from snapshot(s) 610 to the features and/or fingerprints of classification model 629 to determine whether a classification for the exploit is found in classification model 629.

At step 506, in response to a determination that the classification is not found, the snapshot is provided to a second computing device configured to analyze the snapshot for classification of the exploit. For example, with reference to FIG. 6, snapshot provider 626 provides snapshot(s) 610 to server 650 for classification of the exploit. For instance, server 650 may build accumulated data set 632 using raw data from snapshot(s) 610 (e.g., data items). Data analyzer 634 may process accumulated data set 632 to extract features (e.g., various statistical or information-theoretic traits (e.g. count, mean, median, standard deviation, entropy, etc.) and/or fingerprints from accumulated data set 632. Data analyzer 634 may further process extracted features and/or fingerprints using techniques such as ML and DM and classify the determined exploits by type, associate the appropriate features and/or fingerprints with each type, and update classification model 636 accordingly.

In accordance with an embodiment, in response to determining that the classification is not found, the exploit is classified as a zero-day exploit. For example, with reference to FIG. 6, in response to exploit classifier 628 determining that no classification is found in classification model 629, exploit classifier 628 determines that the exploit is a zero-day exploit.

In accordance with an embodiment, in response to determining that the classification is not found, an update for the first classification model is obtained from the second computing device that includes a classification for the exploit, the classification being the obtained classification. For example, with reference to FIG. 6, in response to exploit classifier 628 determining that no classification is not found in classification model 629, classification model 629 receives an update 638 from server 650 that comprises a classification for the exploit, and classification model 629 is updated based on update 638. Exploit classifier 629 then matches extracted features and/or fingerprints from snapshot(s) 610 to the features and/or fingerprints of updated classification model 629 to determine a classification 612 for the exploit. Classification 612 is provided to decision agent 630, which determines defensive reaction(s) to be performed and provides an indication 614 that specifies defensive reaction(s) to be performed to runtime protector 422. Upon receiving indication 614, runtime protector 422 may perform the specified defensive reaction(s).

In accordance with an embodiment, update 638 is a copy of classification model 636. In accordance with another embodiment, update 638 represents a delta between classification model 636 and classification model 629.

It is noted that update 638 may be provided to any number of local stations. For example, as shown in FIG. 6, update 638 is also provided to computing device(s) 601B.

IV. Example Computer System Implementation

Figure 7:
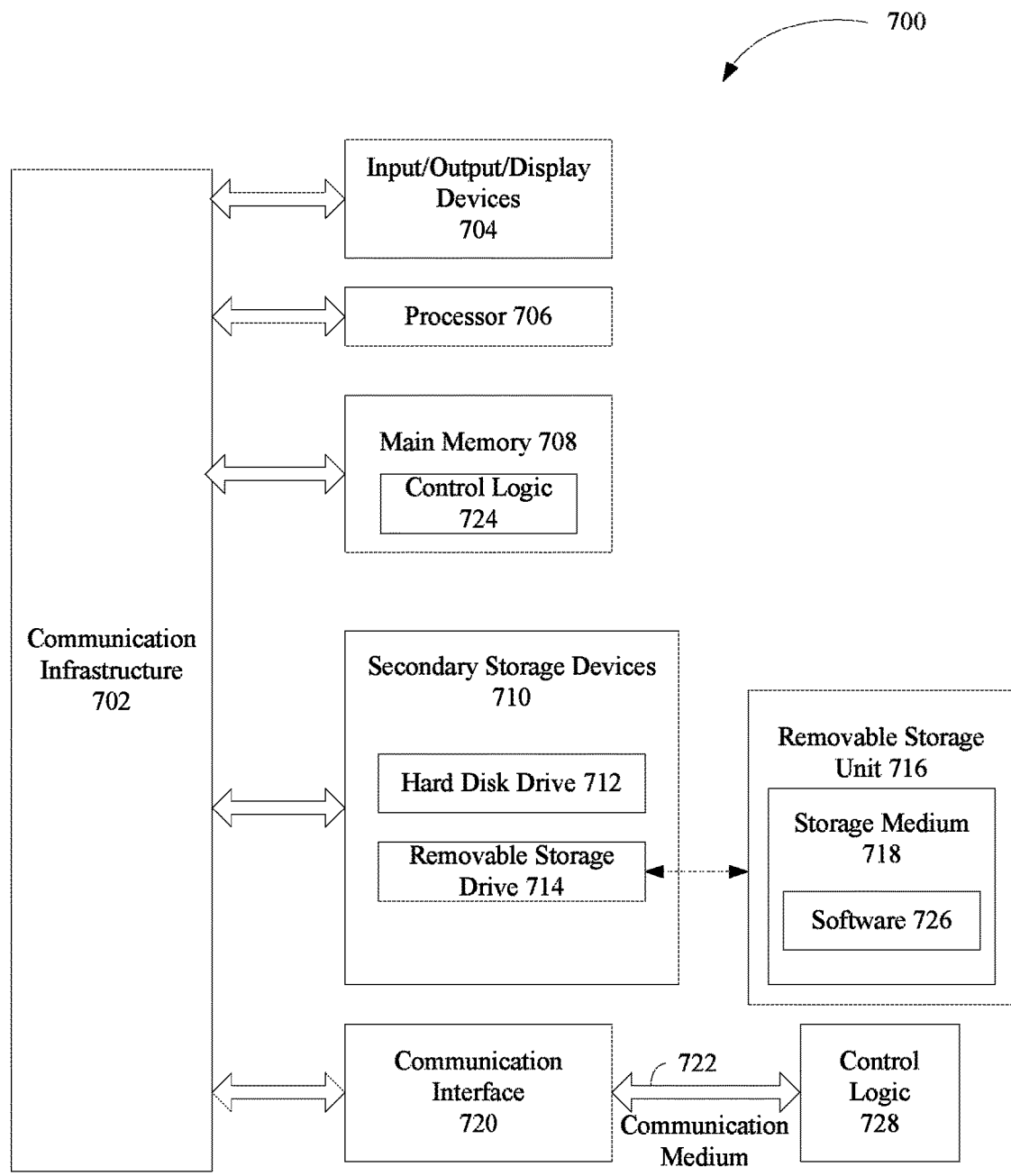
FIG. 7 depicts a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 700 shown in FIG. 7. It should be noted that computer 700 may represent computing devices linked to, processing devices, traditional computers, and/or the like in one or more embodiments. For example, computing system 100 of FIG. 1, computing device 401 of FIG. 4, and computing system 600 of FIG. 6, and any of the sub-systems, components, and/or models respectively contained therein and/or associated therewith, may be implemented using one or more computers 700.

Computer 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads, and in some embodiments, processor 706 may comprise one or more processors.

Computer 700 also includes a primary or main memory 708, such as random access memory (RAM). Main memory 908 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 900 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a computing device, comprising:
   injecting a protection component into a computing process at creation of the computing process;
   determining, by the protection component, that code is malicious based on the code accessing a predetermined resource;
   subsequent to said determining, halting execution of the malicious code, the malicious code being injected into the computing process;
   obtaining a snapshot of at least the computing process in response to halting execution of the malicious code;
   performing a classification process using the snapshot to classify an exploit attempted by the malicious code to obtain a classification of the exploit; and
   handling the exploit based on the obtained classification.

2. The method of claim 1, wherein said performing the classification process comprises:
   analyzing the snapshot with respect to a first classification model stored on the computing device;
   determining whether a classification for the exploit is found in the first classification model; and
   in response to determining that the classification is not found, providing the snapshot to a second computing device configured to analyze the snapshot for classification of the exploit.

3. The method of claim 2, further comprising:
   in response to determining that the classification is not found, classifying the exploit as a zero-day exploit.

4. The method of claim 2, further comprising:
   in response to determining that the classification is not found, obtaining an update for the first classification model from the second computing device that includes the classification for the exploit, the classification for the exploit being the classification obtained by said performing.

5. The method of claim 1, said handling comprising:
   performing at least one of the following based on the obtained classification:
   terminating execution of the computing process;
   restarting the computing process; and
   isolating the malicious code.

6. The method of claim 1, said obtaining a snapshot comprising:
obtaining a snapshot of at least the computing process and an operating system executing on the computing device in response to halting execution of the malicious code.

7. The method of claim 1, wherein the snapshot comprises at least one of the following data items:
register values at a time of said halting;
a number of sequential calls from a particular library module that occurred prior to said halting;
a listing of library modules loaded at the time of said halting;
a listing of file handles opened at the time of said halting; and
at least a partial memory dump at the time of said halting.

8. A computing device, comprising:
one or more processing units; and
a memory coupled to the one or more processing units, the memory storing instructions, which, when executed by the one or more processing units, are configured to perform operations, the operations comprising:
injecting a protection component into a computing process at creation of the computing process;
determining, by the protection component, that code is malicious based on the code accessing a predetermined resource;
subsequent to said determining, halting execution of the malicious code, the malicious code being injected into the computing process;
obtaining a snapshot of at least the computing process in response to halting execution of the malicious code;
performing a classification process using the snapshot to classify an exploit attempted by the malicious code to obtain a classification of the exploit; and
handling the exploit based on the obtained classification.

9. The computing device of claim 8, wherein said performing the classification process comprises:
analyzing the snapshot with respect to a first classification model stored on the computing device;
determining whether a classification for the exploit is found in the first classification model; and
in response to determining that the classification is not found, providing the snapshot to a second computing device configured to analyze the snapshot for classification of the exploit.

10. The computing device of claim 9, the operations further comprising:
in response to determining that the classification is not found, classifying the exploit as a zero-day exploit.

11. The computing device of claim 9, the operations further comprising:
in response to determining that the classification is not found, obtaining an update for the first classification model from the second computing device that includes the classification for the exploit, the classification for the exploit being the classification obtained by said performing.

12. The computing device of claim 8, said handling comprising:
performing at least one of the following based on the obtained classification:
terminating execution of the computing process;
restarting the computing process; and
isolating the malicious code.

13. The computing device of claim 8, said obtaining a snapshot comprising:
obtaining a snapshot of at least the computing process and an operating system executing on the computing device in response to halting execution of the malicious code.

14. The computing device of claim 8, wherein the snapshot comprises at least one of the following data items:
register values at a time of said halting;
a number of sequential calls from a particular library module that occurred prior to said halting;
a listing of library modules loaded at the time of said halting;
a listing of file handles opened at the time of said halting; and
at least a partial memory dump at the time of said halting.

15. A non-transitory computer-readable storage medium having program instructions recorded thereon that, when executed by a processor of a computing device, perform a method for handling an exploit attempted by malicious code, the method comprising:
injecting a protection component into a computing process at creation of the computing process;
determining, by the protection component, that code is malicious based on the code accessing a predetermined resource;
subsequent to said determining, halting execution of the malicious code, the malicious code being injected into the computing process;
obtaining a snapshot of at least the computing process in response to halting execution of the malicious code;
performing a classification process using the snapshot to classify an exploit attempted by the malicious code to obtain a classification of the exploit; and
handling the exploit based on the obtained classification.

16. The non-transitory computer-readable storage medium of claim 15, wherein said performing the classification process comprises:
analyzing the snapshot with respect to a first classification model stored on the computing device;
determining whether a classification for the exploit is found in the first classification model; and
in response to determining that the classification is not found, providing the snapshot to a second computing device configured to analyze the snapshot for classification of the exploit.

17. The non-transitory computer-readable storage medium of claim 16, the method further comprising:
in response to determining that the classification is not found, classifying the exploit as a zero-day exploit.

18. The non-transitory computer-readable storage medium of claim 16, the method further comprising:
in response to determining that the classification is not found, obtaining an update for the first classification model from the second computing device that includes the classification for the exploit, the classification for the exploit being the classification obtained by said performing.

19. The non-transitory computer-readable storage medium of claim 15, said handling comprising:
performing at least one of the following based on the obtained classification:
terminating execution of the computing process;
restarting the computing process; and
isolating the malicious code.

20. The non-transitory computer-readable storage medium of claim 15, said obtaining a snapshot comprising:

obtaining a snapshot of at least the computing process and an operating system executing on the computing device in response to halting execution of the malicious code.

\* \* \* \* \*